(12) United States Patent
Lin et al.

(10) Patent No.: US 11,515,978 B2
(45) Date of Patent: Nov. 29, 2022

(54) METHOD FOR CHANNEL STATE INDICATION-REFERENCE SIGNAL CONFIGURATION UPDATE AND SPATIAL INDICATION SWITCH

(71) Applicant: MEDIATEK INC., Hsin-Chu (TW)

(72) Inventors: Hsuan-Li Lin, Hsinchu (TW); Zhixun Tang, Beijing (CN); Tsang-Wei Yu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/090,896

(22) Filed: Nov. 6, 2020

(65) Prior Publication Data

US 2021/0143956 A1 May 13, 2021

(30) Foreign Application Priority Data

Nov. 8, 2019 (WO) ................ PCT/CN2019/116622
Nov. 2, 2020 (CN) .......................... 202011204451.9

(51) Int. Cl.
*H04L 5/00* (2006.01)
*H04W 72/04* (2009.01)

(52) U.S. Cl.
CPC ......... *H04L 5/0048* (2013.01); *H04W 72/042* (2013.01); *H04W 72/0413* (2013.01)

(58) Field of Classification Search
CPC ............ H04L 5/0048; H04W 72/0413; H04W 72/042
See application file for complete search history.

(56) References Cited

U.S. PATENT DOCUMENTS

2019/0342907 A1* 11/2019 Huang ................ H04L 5/0053

OTHER PUBLICATIONS

Qualcomm Incorporated, Beam management for NR, 3GPP TSG-RAN WG1 Meeting #94bis, Chengdu, China, Oct. 8-12, 2018, R1-1811633, XP051519027.
Nokia et al., Remaining issues on beam management, 3GPP TSG RAN WG1 Meeting #92bis, Sanya, P.R. China, Apr. 16-20, 2018, R1-1805104, XP051427363.
VIVO, Further discussion on Multi-Beam Operation, 3GPP TSG RAN WG1 #98, Prague, CZ, Aug. 26-30, 2019, R1-1908167, XP051764786.

* cited by examiner

Primary Examiner — Ronald B Abelson
(74) Attorney, Agent, or Firm — Winston Hsu (57) ABSTRACT

A method is provided for TCI switching related to CSI-RS measurement and reporting, spatial relation switch for SRS, PUSCH, and PUCCH. The PDSCH and PDCCH are received according to the QCLed aperiodic CSI-RS. When the AP CSI-RS is configured as the reference in the TCI of PDSCH, UE may apply the updated TCI for the PDSCH, after the corresponding aperiodic report has been received at the network. Spatial relation switch is based on the valid measurement report. The spatial relation switch delay of aperiodic SRS can be performed when UE has sent the corresponding measurement report to the network.

14 Claims, 7 Drawing Sheets

METHOD FOR CHANNEL STATE INDICATION-REFERENCE SIGNAL CONFIGURATION UPDATE AND SPATIAL INDICATION SWITCH

BACKGROUND

In a network, with multi-beam technology, TCI (transmission configuration indication) can be provided to proceed UE (user equipment) reception.

Presently, TCI state switch requirements for downlink control and data channel have been provided. However, for AP CSI-RS (aperiodic channel state information-reference signal) resource and reporting, the TCI state can be triggered or the AP CSI-RS resource set can also be reconfigured, but the UE behavior and requirements are not provided yet.

In the field, the procedure for TCI switch and SR (spatial relation) switch of the AP CSI-RS resource and reporting is still not yet provided.

SUMMARY

An embodiment provides a method for CSI-RS (channel state indication-reference signal) configuration update and spatial indication switch. The method includes receiving a CSI-RS by user equipment in a network according to a delay of CSI-RS configuration/trigger update; receiving first data by the user equipment according to a configured TCI (transmission configuration indication) state; and transmitting second data by the UE according to whether a known condition of the second data is fulfilled and a corresponding SR (spatial relation) switch delay for the second data. The first data comprises a PDCCH (physical downlink control channel) and/or a PDSCH (physical uplink control channel), and the second data comprises an SRS (sounding reference signal), a PUSCH (physical uplink shared channel) and/or a PUCCH (physical uplink control channel).

These and other objectives of the present invention will no doubt become obvious to those of ordinary skill in the art after reading the following detailed description of the preferred embodiment that is illustrated in the various figures and drawings.

DETAILED DESCRIPTION

Figure 1:
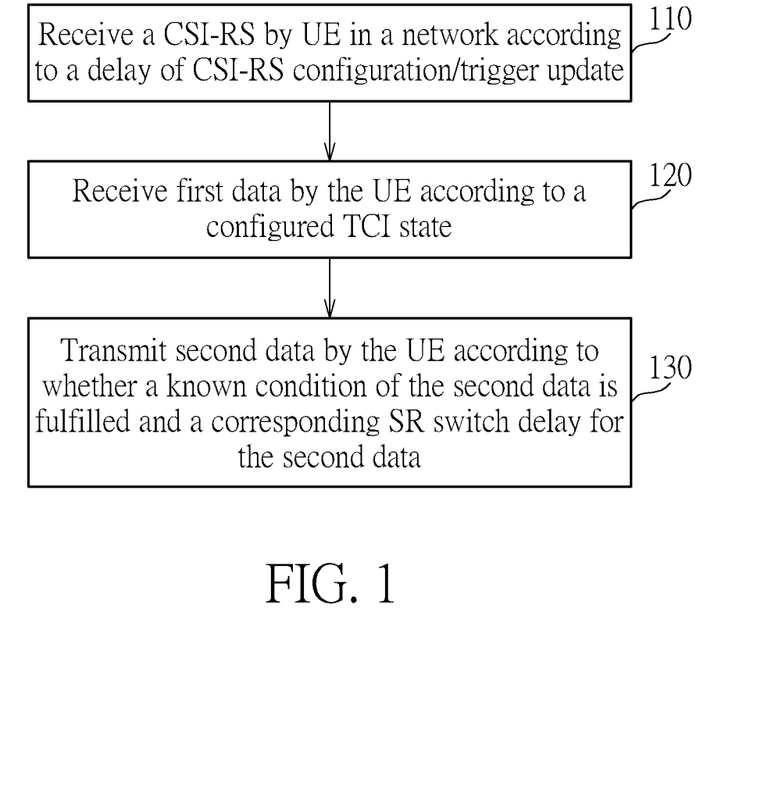
FIG. 1 illustrates a flowchart of a method for CSI-RS configuration update and spatial indication switch according to an embodiment.

In order to provide the procedure for TCI switch and SR (spatial relation) switch of the AP CSI-RS resource and reporting, a method is disclosed. FIG. 1 illustrates a flowchart of a method 100 for CSI-RS configuration update and spatial indication switch according to an embodiment. The method 100 may include the following steps.

Step 110: receive a CSI-RS by UE in a network according to a delay of CSI-RS configuration/trigger update;

Step 120: receive first data by the UE according to a configured TCI state; and

Step 130: transmit second data by the UE according to whether a known condition of the second data is fulfilled and a corresponding SR switch delay for the second data.

In steps 110 to 130, the first data comprises a PDCCH (physical downlink control channel) and/or a PDSCH (physical uplink control channel); and the second data comprises an SRS (sounding reference signal), a PUSCH (physical uplink shared channel) and/or a PUCCH (physical uplink control channel). The abovementioned network may be an NR (new radio) network. Here in the text, the spatial indication may include SR (spatial relation) and/or TCI. According to embodiments, in a UL (uplink) condition, the said spatial indication may be SR; and in a DL (downlink) condition, the said spatial indication may be TCI.

Figure 2:
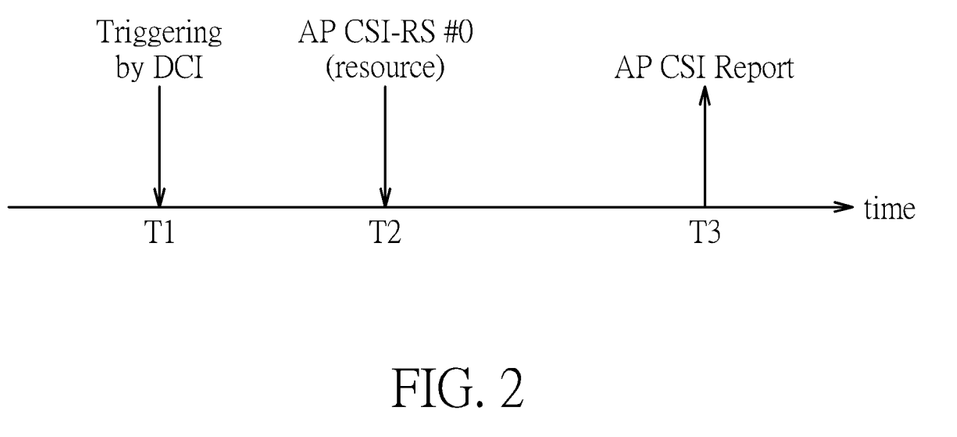
FIG. 2 illustrates a time diagram of the triggering of AP CSI-RS resource and AP CSI reporting according to an embodiment.

FIG. 2 illustrates a time diagram of the triggering of AP (aperiodic) CSI-RS resource and AP CSI reporting according to an embodiment. The upward arrow can refer to the UE sending data; and the downward arrow can refer to the UE receiving data. As shown in FIG. 2, at the time T1, the UE may receive a triggering by DCI (downlink control information) from the network. At the time T2, the resource may be performed, where the UE may receive the reference signal from the network, and the reference signal may be of AP CSI-RS #0. At the time T3, the UE may perform the AP CSI report by reporting to the network. According to an embodiment, the UE has to perform the AP CSI report within a predetermined time interval since the time T1. By means of the operations described in FIG. 2, the channel state can be reported.

Figure 3:
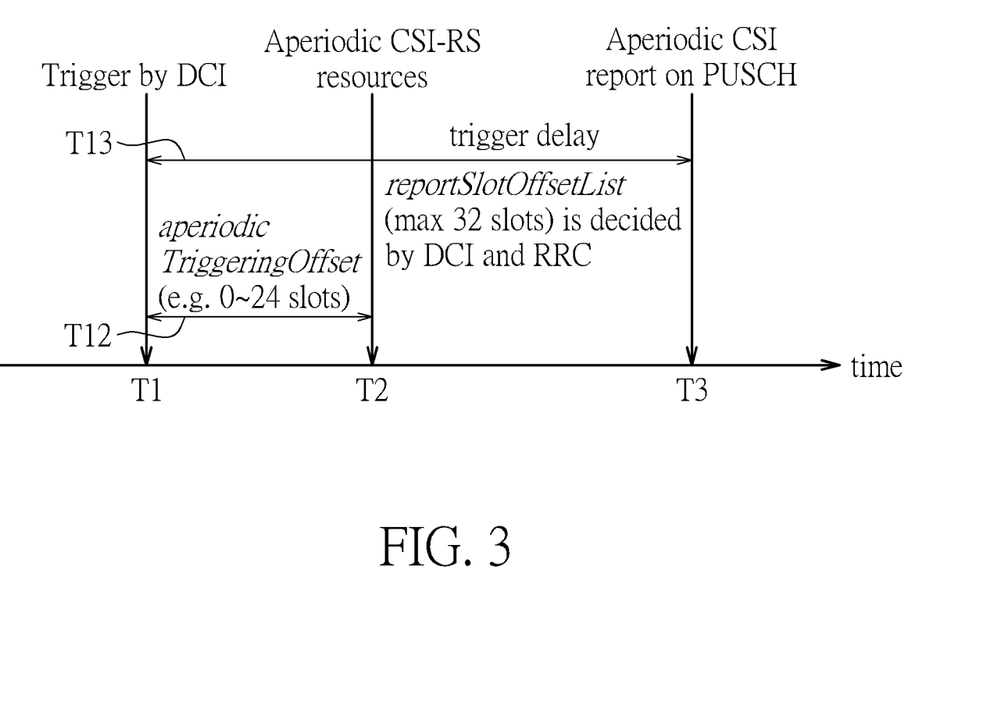
FIG. 3 illustrates a time diagram of AP CSI-RS resource set transmission and report offset according to an embodiment.

FIG. 3 illustrates a time diagram of AP CSI-RS resource set transmission and report offset according to an embodiment. FIG. 3 can be an example of FIG. 2. In FIG. 3, the aperiodic CSI report can be sent on PUSCH. In FIG. 3, for example, the time difference T12 between the times T1 and T2 can be defined using a parameter aperiodicTriggeringOffset. For example, the time difference T12 may be 0 to 24 slots. The time difference T12 between the times T1 and T2 can be defined using, for example, a parameter reportSlotOffsetList. The time difference T13 may be regarded as a trigger delay, and be decided by DCI and RRC (radio resource control). For example, the maximum of the trigger delay T13 may be 32 slots.

According to embodiments, the processing or trigger delay of CSI-RS configuration/trigger update can be as below.

(Scenario 1) The CSI-RS Configuration is Periodically Updated:

It can be described the CSI-RS is periodic. The processing delay of CSI-RS configuration update may be a sum of an RRC (radio resource control) processing time and a time of fine time tracking in a new Rx (receiving) beam.

(Scenario 2) The CSI-RS Configuration is Semi-Persistently Updated:

It can be described the CSI-RS is semi-persistent. The processing delay of CSI-RS configuration update may be a sum of an HARQ (hybrid automatic repeat request) feedback time, an MAC-CE (medium access control-control element) processing time, and a time of fine time tracking in a new Rx (receiving) beam.

(Scenario 3) The CSI-RS Trigger is Aperiodically Updated:

It can be described the CSI-RS is aperiodic. The trigger delay of the aperiodic CSI-RS may be a time related to allowed slot offsets. For example, the trigger delay of aperiodic CSI-RS (for the CSI report) may be X slots, singled by higher layer parameter reportSlotOffsetList. In this scenario, a TCI triggering delay for the aperiodic CSI-RS is based on a timing of triggering an aperiodic report.

According to embodiments, the switch of the spatial indication (e.g., SR or TCI) may be as described in Table 1. Table 1 describes four scenarios of UP and one scenario of DL. In Table 1, regarding UL, SR is updated, and the target SR should be known. Regarding DL, TCI is updated, and the target TCI state should be known. The target SR can be regarded known when (i) it is measured and reported by the UE, and (ii) the time of reporting is within a predetermined time interval (e.g., 1280 msec).

TABLE 1

| | "Target" spatial indications | The limitations |
|---|---|---|
| UL (uplink) with PUCCH/PUSCH | SR (spatial relation) switches to a target DL RS | (SSB or P/SP/AP CSI-RS) Target SR associated with AP CSI-RS is known. |
| | SR switches to a target ULS RS | Target SR associated with SRS is known. |
| UL (uplink) with P (periodic)/ SP (semi-persistent)/ AP (aperiodic) SRS | SR switches to a target DL RS | (SSB or P/SP/AP CSI-RS) Target SR for AP SRS is known. |
| | | Target SR associated with AP CSI-RS is known. |
| | SR switches to a target UL SRS | Target SR associated with SRS is known. |
| DL (downlink) with P/SP/AP CSI-RS | TCI switches to a target TCI state. (The target TCI state may relate to SSB or CSI-RS) | Target TCI for AP CSI-RS is known. Target TCI associated with AP CSI-RS is known. |

According to embodiments, regarding "known target" mentioned above, the following operations should be performed:
(1) The UE receives the RRC config. (configuration), including L1-RSRP (reference signal received power) report config., L1-RSRP resource config., SRS config. or CSI-RS config.;
(2) the UE measures L1-RSRP. (e.g., SSB#1, SSB#2);
(3) the UE reports L1-RSRP (e.g., SSB#1) (in slot (n-q)); and
(4) the UE receives the switch command of the updated SR or the updated TCI for the CSI-RS in slot n, where UE applies the SR or TCI (which is not yet updated) for the CSI-RS until slot n.

The operations (1) to (4) said here can be performed sequentially in time, and the target spatial indication can be regarded "known". In the operation (3), the UE should report L1-RSRP in slot (n-q) means L1-RSRP should be reported early enough. In the operation (4), the original SR or TCI is still in use when the switch command is received.

Regarding SRS, there may be two scenarios:
(scenario-a) type of SRS resource (or CSI-RS resource) is aperiodic, and the target of updated spatial indication is known; and (scenario-b) type of SRS resource (or CSI-RS resource) is aperiodic, and the target of updated spatial indication is unknown. Related details are described below.

Regarding the Scenario-a:

If type of SRS resource (or CSI-RS resource) is aperiodic, and the target of the updated spatial indication is known (the scenario-a mentioned above), the spatial indication is spatial relation for SRS and TCI state of CSI-RS. For example, the original SR is SSB#0, and the updated SR can be SSB#1. In another example, the original TCI is SSB#0, and the updated TCI can be SSB#1. The SSB#1 SNR (i.e. Es/Iot) should be larger than −3 dB. The spatial indication means Type-D QCLed provided by a higher layer of the network. Then, the UE can apply the updated SR or updated TCI for the CSI-RS based on the timing of triggering to the timing of the aperiodic report; or, the UE can apply the updated SR or updated TCI at least after TimePeriod#1 (slot n+k+1), where k may be a predefined variable. In other words, if the command received at slot n is known, the UE can apply the updated SR or the updated TCI after slot (n+k). If the updated CSI-RS is configured in the TCI state of PDCCH/PDSCH, the UE can receive PDCCH/PDSCH according to the updated CSI-RS after TimePeriod#2 (slot n+k+1 or longer).

Figure 4:
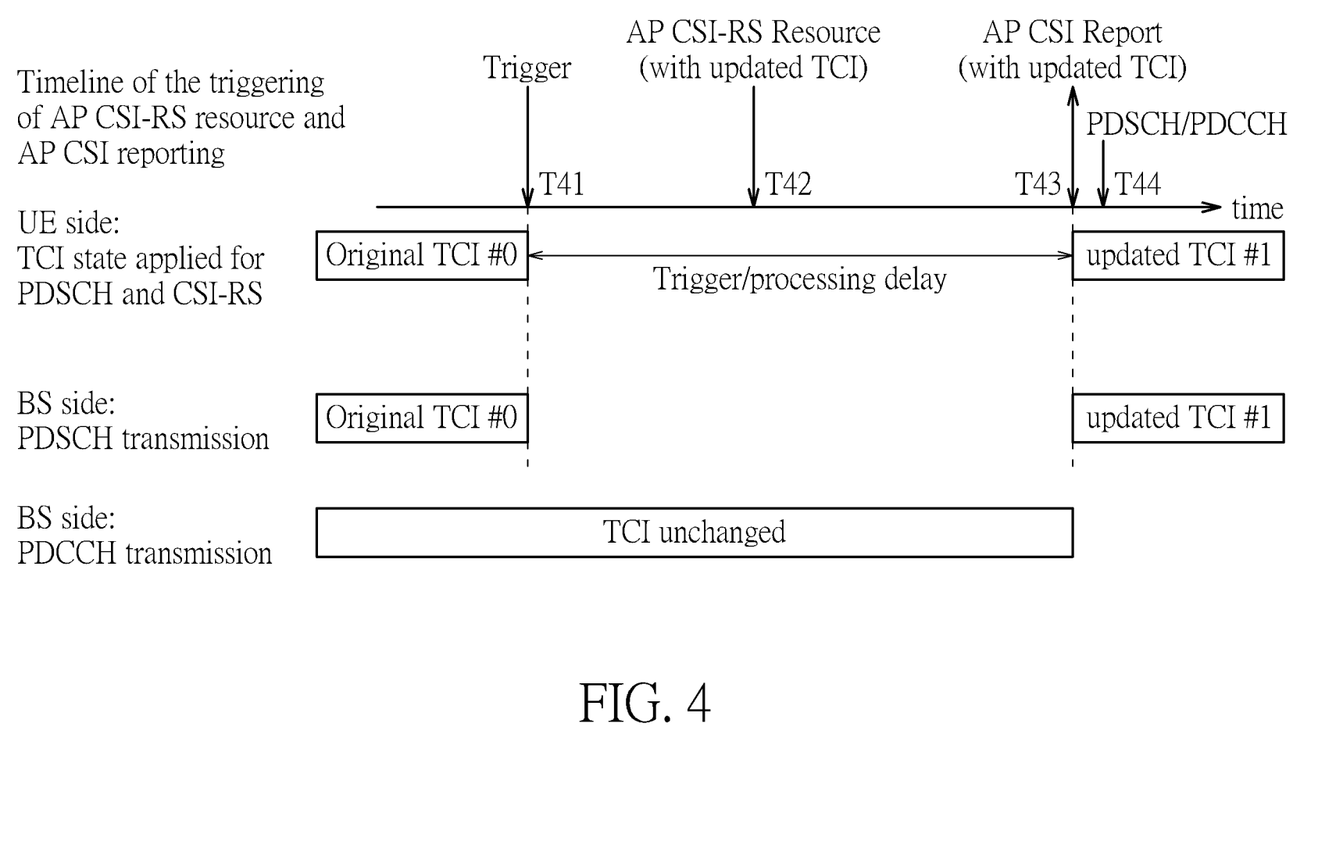
FIG. 4 illustrates a time diagram of the triggering of AP CSI-RS and AP CSI reporting according to an embodiment.

FIG. 4 illustrates a time diagram of the triggering of AP CSI-RS and AP CSI reporting according to an embodiment. FIG. 4 can be related to the abovementioned scenario-a. The upward arrow can mean the UE sends data; and the downward arrow can mean the UE receives data. After the time T41, a trigger is received. At the time T42, the AP CSI-RS resource can be performed. At the time T43, the UE can send the AP CSI report, and receive the TCI. At the time T44, the PDSCH and/or the PDCCH can be received. As shown in FIG. 4, before the time T41 the original TCI#0 is used for receiving control or data. Between the times T41 and T43, the time difference can be regarded a trigger/processing delay. After the time 43, since the report is finished, the updated TCI#1 can be applied for receiving data. In the example of FIG. 4, the PDSCH transmission is applied, so the TCI is not updated for the PDCCH transmission.

Regarding the Scenario-b:

If type of SRS resource (or CSI-RS resource) is aperiodic, and the target of the updated spatial indication is unknown (scenario-b mentioned above), then the UE can retune its Rx (receiving) beam for the updated SR or the updated TCI of the CSI-RS. The retuned Rx beam can be applied to apply the updated SR or updated TCI for the CSI-RS latter on. Hence, when the updated spatial indication is unknown, additional time of retuning Rx beam is required. Regarding UL, the UE can transmit SRS/PUSCH/PUCCH with arbitrary spatial domain transmission filter during the Rx/Tx beam training phase.

Regarding the Known Condition for the SR Switch:

According to embodiments, regarding the SR switch, the known condition for the SR switch can be as described below. For example, the aperiodic SRS can be considered. During the period from the last transmission of the DL RS resource used for the L1-RSRP measurement reporting for the target SR to the completion of the active SR switch, where the DL RS resource for L1-RSRP measurement is the RS in the target SR or QCLed to the target SR. The following conditions have to be met for the SR to be known:
1. The SR switch command is received within 1280 msec of the last transmission of the RS resource for beam reporting or measurement. (After reporting, the switch command is received while the report is still valid).

2. The UE has sent at least 1 L1-RSRP report for the target SR before the SR switch command.
3. The RS in the target SR remains detectable during the SR switching period.
4. The SSB associated with the SR remains detectable during the SR switching period. (For example, SNR of the SR≥−3 dB.)

Otherwise, the SR can be unknown. In other words, the SR can be known when two conditions are met: (1) L1-RSRP is measured and reported within a predetermined time interval (e.g., 1280 msec), and (2) RS in target SR remains detectable. The QCLed information can be obtained by higher layer signaling (e.g., RRC or MAC-CE).

Regarding TCI update, according to embodiments, the TCI state is known if the following conditions are met:

During the period from the last transmission of the RS resource used for the L1-RSRP measurement reporting for the target TCI state to the completion of active TCI state switch, where the RS resource for L1-RSRP measurement is the RS in target TCI state or QCLed to the target TCI state.
1. TCI state switch command is received within 1280 msec upon the last transmission of the RS resource for beam reporting or measurement.
2. The UE has sent at least 1 L1-RSRP report for the target TCI state before the TCI state switch command.
3. The TCI state remain detectable during the TCI state switching period.
4. The SSB associated with the TCI state remain detectable during the TCI switching period. (For example, SNR of the TCI state≥−3 dB).

Otherwise, the TCI state is unknown.

According to embodiments, for the aperiodic CSI-RS, the first data comprises a PDCCH (physical downlink control channel) and a PDSCH (physical uplink control channel) QCLed (quasi co-located) to the aperiodic CSI-RS, the UE applies an updated TCI of the aperiodic CSI-RS to the PDCCH and the PDSCH according to a corresponding aperiodic report received at the network.

If a spatial setting of the PUCCH is configured to be of an SSB (synchronization signal block) index or a CSI-RS index, a known condition for the SR re-uses a known condition of the TCI state. If a spatial setting of the PUCCH is configured for SRS, and the SR is in a known condition, the SR is switched.

According to embodiments, the CSI (channel state information) reporting of the CSI-RS is one of CQI (channel quality indication) reporting, RI (rand indication) reporting and PMI (precoding matrix indication) reporting.

According to embodiments, when the SRS is aperiodic, a spatial relation switch delay of the aperiodic SRS is only applicable in a known condition, and the spatial relation switch delay of the aperiodic SRS is measured only when the UE has sent a corresponding measurement report to the network and the spatial relation of the aperiodic SRS is in a known condition.

Figure 5:
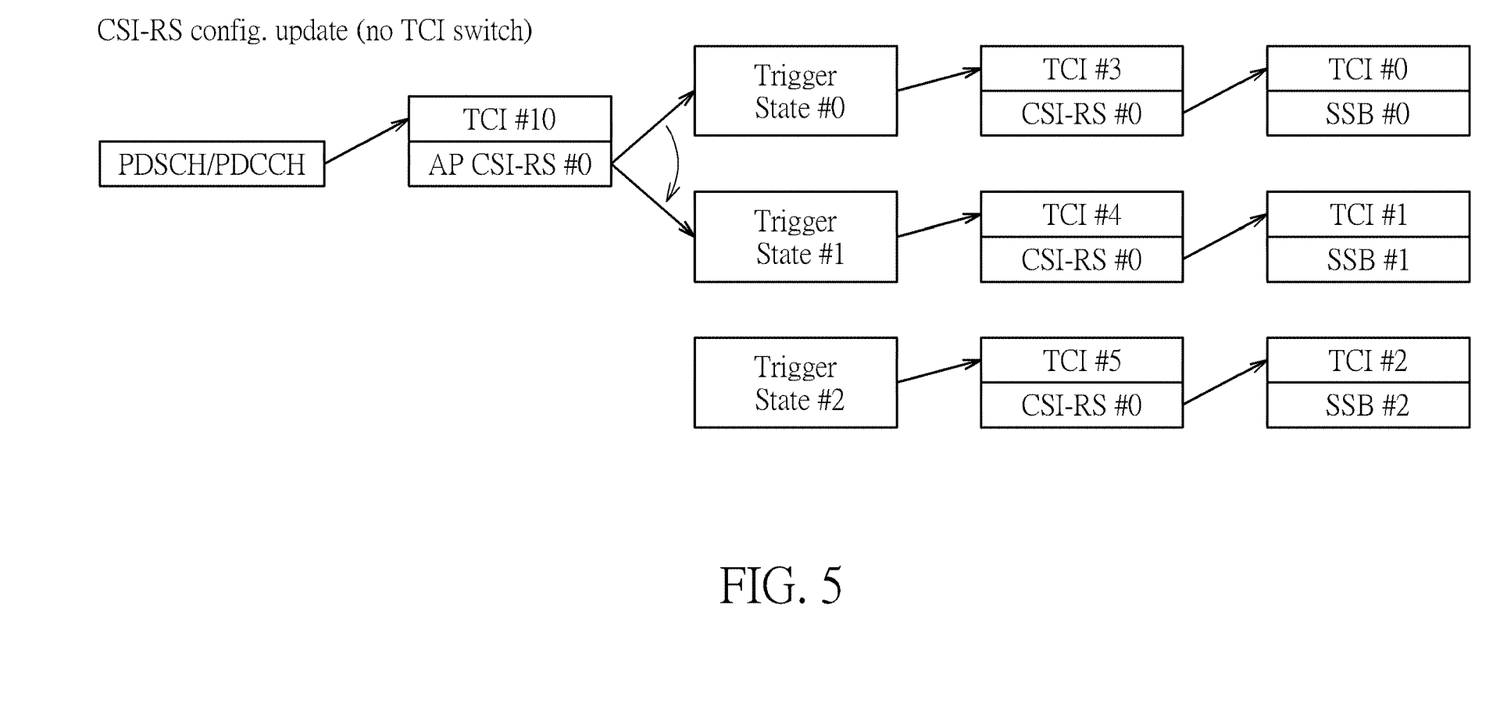
FIG. 5 illustrates the states of updating the AP CSI-RS in PDSCH/PDCCH TCI according to an embodiment.

FIG. 5 illustrates the states of updating the AP CSI-RS in PDSCH/PDCCH TCI according to an embodiment. In FIG. 5, the CSI-RS config. is updated with no TCI switch. For AP CSI-RS, there is an update switch behavior which can be illustrated as a series/bunch of states as shown in FIG. 5. As shown in FIG. 5, the trigger state#0 can be switched to the trigger state#1 only after the reporting.

Figure 6:
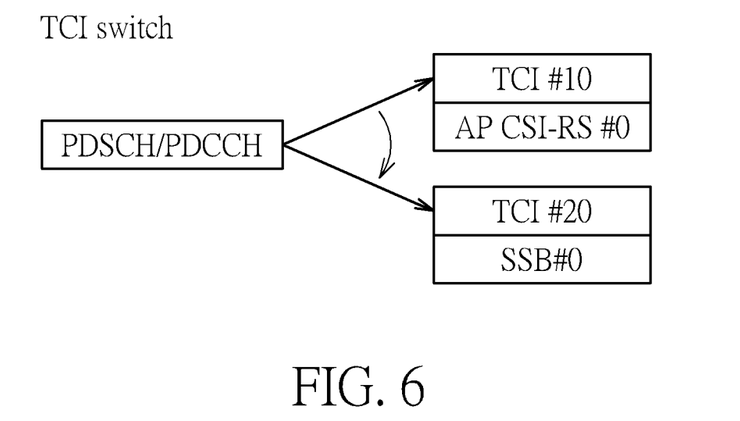
FIG. 6 illustrates the TCI switch according to an embodiment.
Figure 7:
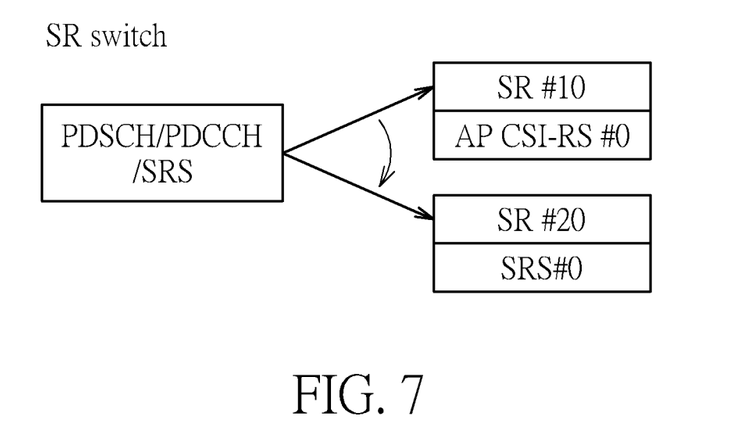
FIG. 7 illustrates the SR switch according to an embodiment.

FIG. 6 illustrates the TCI switch according to an embodiment. In the example, the TCI#10 with AC CSI-RS#0 can switch to the TCI#20 with SSB#0. FIG. 7 illustrates the SR switch according to an embodiment. In the example, the SR#10 with AC CSI-RS#0 can switch to the SR#20 with SSB#0.

Figure 8:
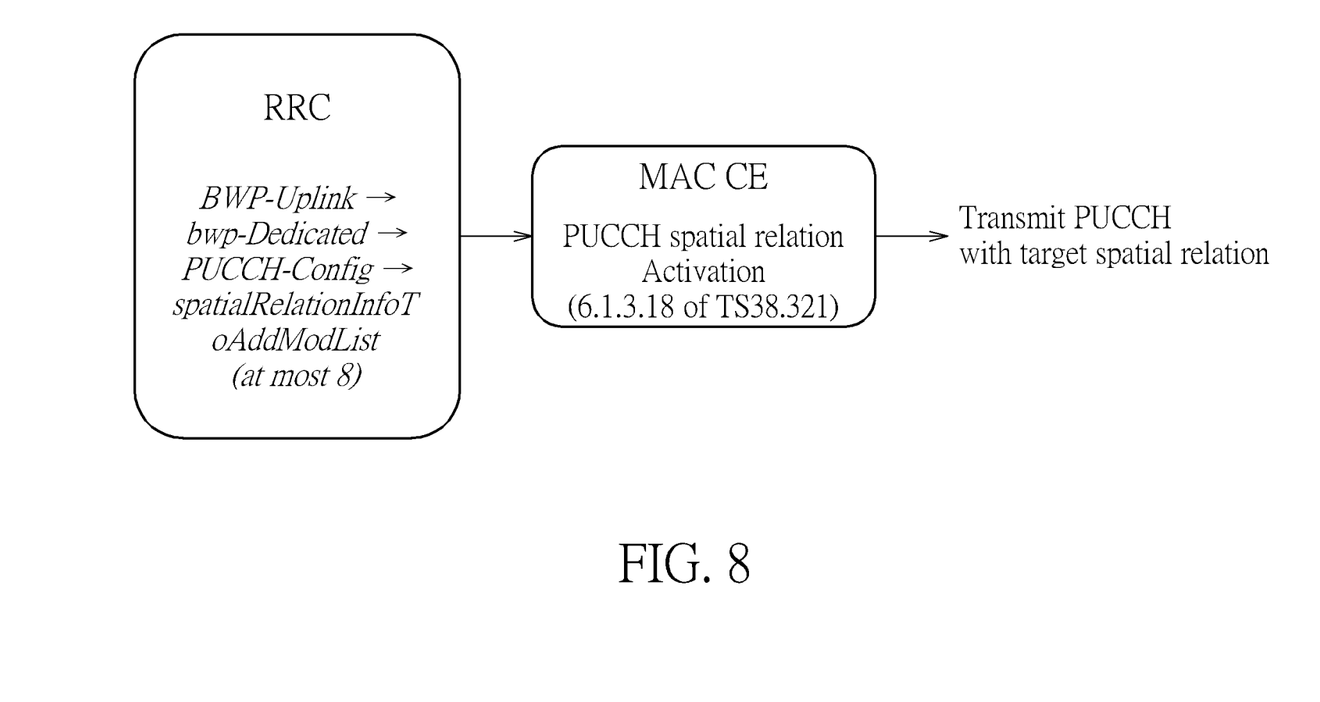
FIG. 8 illustrates a PUCCH activation procedure according to an embodiment.

FIG. 8 illustrates a PUCCH activation procedure according to an embodiment. FIG. 8 can be a procedure of the SR uplink signal. The RRC can update the list of the SR, and the MAC-CE can select one SR for the PUCCH. For example, the RRC can have 8 SR states, and the MAC-CE can select one SR state from the 8 SR states. Then, the PUCCH can be transmitted with the target SR. In FIG. 8, regarding the RRC, for example, the parameters BWP-Uplink, bwp-Dedicated and PUCCH-Config can be sequentially configured, and then the parameter spatialRelationInfoToAddModList can be configured to have at most 8 states. In FIG. 8, regarding the MAC-CE, the PUCCH spatial relation activation can be performed. The procedure of FIG. 8 is for control channel of uplink.

Figure 9:
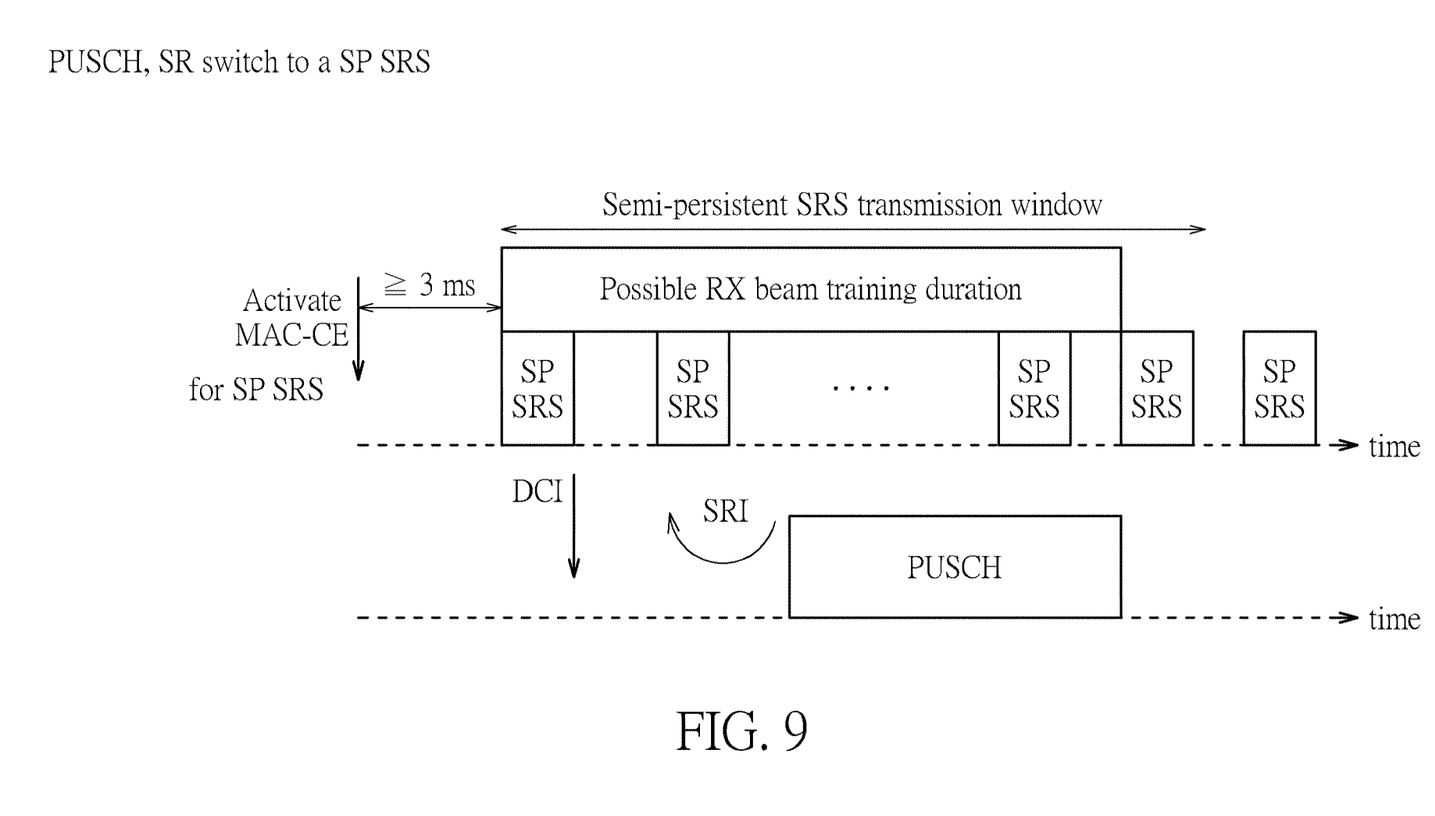
FIG. 9 illustrates a time diagram of PUSCH scheduling in a possible SRS linked according to an embodiment.

FIG. 9 illustrates a time diagram of PUSCH scheduling in a possible SRS linked according to an embodiment. In FIG. 9, with the PUSCH, the SR switched to a SP SRS. First, the MAC-CE can activate the SP SRS. Hence, a Rx beam training has to be performed during a possible Rx beam training duration. Then, uplink data can switch to the SP SRS.

The techniques of embodiments are further described as follows. In the DL (downlink), the CSI-RS resources can be periodic, semi-persistent, or aperiodic. Periodic CSI-RS is configured by RRC (Radio Resource Control) signaling. Semi-persistent (SP) CSI-RS is activated by MAC-CE (Media Access Control-Control Element). Aperiodic CSI-RS is triggered/activated by DCI (Downlink Control Information) command. The delay requirement for all these three types of CSI-RS resources are different, and the framework of these three CSI-RS configuration update could follow the agreed requirements respectively.

(Scenario 1) Periodic CSI-RS Configuration Update:
The processing delay could be RRC processing time plus the fine time tracking in the new Rx beam.

(Scenario 2) Semi-Persistent CSI-RS Configuration Update:
The processing delay could be HARQ (Hybrid Automatic Repeat reQuest) feedback, MAC-CE processing time plus the fine time tracking in the new receiving (Rx) beam.

(Scenario 3) Aperiodic CSI-RS Trigger Update:
The aperiodic CSI-RS trigger delay (for the CSI report)is X slots, singled by higher layer parameter reportSlotOffsetList. As shown in FIG. 2.

As shown in FIG. 5, when the AP CSI-RS can configured as the reference in the TCI of PDSCH, UE would apply the updated TCI for the PDSCH, after the trigger delay or the processing delay abovementioned, as shown in FIG. 4.

One case is that UE may miss the DCI which triggering the AP CSI-RS, and UE would not be able to applied the updated TCI for PDSCH. When network notice the AP CSI report has not been transmitted successfully after the triggering delay, network would re-trigger the AP-CSI RS via DCI or reconfigured TCI of PDCCH via RRC.

As shown in FIG. 5, when the AP CSI-RS can configured as the reference in the TCI of PDSCH, UE would apply the updated TCI for the PDCCH, after the trigger delay or the processing delay abovementioned, as shown in FIG. 4. In other words, based on the corresponding aperiodic reporting, gNB (e.g., base station) can apply the updated TCI to transmit and UE can apply also apply the updated TCI to received.

One case is that UE may miss the DCI which triggering the AP CSI-RS, and UE would not be able to applied the updated TCI for PDCCH. When network notice the AP CSI report has not been transmitted successfully after the triggering delay, network would re-trigger the AP-CSI RS via DCI or reconfigured TCI of PDCCH via RRC, by using the original TCI state for PDCCH.

In the UL (uplink), the spatial relation for uplink PUCCH (Physical Uplink Control Channel), PUSCH (Physical Downlink Shared Channel), and SRS (sounding RS) could be provided. The UE uplink channel and RS can be QCLed (quasi-co-located) with a SRS or downlink RS based on this spatial relation configuration.

Regarding the active Spatial Relation switch for PUCCH, the procedure of active spatial relation switch for PUCCH is similar as active TCI state switch for PDSCH in downlink which is shown as follow. RRC at first configures with 8 spatial relations and PUCCH spatial relation activation. MAC CE activates one of the spatial relation for PUCCH. The UE will transmit the PUCCH using a same spatial domain filter as a reception of a SSB or CSI-RS or a transmission of a SRS. If the QCLed RS was not reported in the recent time, the UE will execute additional Rx beam sweeping for the downlink RS or Tx beam sweeping for the uplink SRS. Thus, we can define the known conditions for spatial relation similar as TCI state switch for DL. However, if PUCCH is associated with uplink SRS, PUCCH will directly use the same beam with this uplink SRS. UE do not need the additional beam sweeping time.

When the spatial relation for PUCCH is unknown, the UE should execute the Rx beam sweeping to train the downlink spatial domain filter before transmitting the PUCCH with the same spatial domain transmission filter. During the training phase, the PUCCH is allowed to be transmitted with arbitrary spatial domain transmission filter. The PUCCH signal quality cannot be guaranteed until UE finishes the active spatial relation switch.

Regarding the active Spatial Relation switch for PUSCH, the PUSCH spatial relation activation behavior is different as downlink PDSCH which is indicated by DCI. PUSCH spatial relation is explicitly demonstrated in spec and follows the PUCCH or SRS spatial relation in different DCI command. When DCI format 0_0 is configured, PUSCH always follows the same spatial domain transmission filter as for PUCCH. When DCI format 0_1 is configured, the UE shall transmit PUSCH using the same antenna ports as the SRS port(s) in the SRS resource(s) indicated by SRI (SRS resource indicator.

Regarding the active Spatial Relation switch for SRS, the SRS resources also can be periodic, semi-persistent, or aperiodic. Periodic SRS is configured by RRC. Semi-persistent SRS is activated by MAC-CE. Aperiodic SRS is triggered/activated by DCI command. Similarly as CSI-RS, the issue in spatial relation for SRS is whether define known condition and whether apply both known/unknown requirement to active spatial relation switch for SRS. If the SRS is associated with another UL SRS, UE will directly use the same beam for this uplink SRS. UE does not need the additional beam sweeping time.

If the SRS is associated with the DL RS, the intention is that uplink transmission could refer to the same beam used in downlink. Obviously, the network should have some historic measurement information for this downlink RS beam. The reason why unknown scenario is defined for data/control channel is the data burst could be triggered occasionally. When the network want to trigger the data burst transmission, the network may have the beam reports from UE. However, periodic/semi-persistent SRS transmission is different as the data burst. The periodic/semi-persistent SRS transmission will span a long time and network can have enough time to decide which DL RS should be associated when configure the periodic/semi-persistent SRS transmission.

Generally, periodic/semi-persistent SRS transmission usage can be 'codebook', 'nonCodebok' PUSCH will be scheduled based on the SRS resource indicator (SRI). The indicated SRI in slot n is associated with the most recent transmission of SRS resource identified by the SRI, where the SRS resource is prior to the PDCCH carrying the SRI before slot n. If the associated SRS for PUSCH is linked to DL RS and the spatial relation is unknown, it means the SRS will be transmitted through arbitrary spatial domain transmission filter during the DL Rx beam training duration. It is worth noting that if UE shall transmit PUSCH using the same antenna port(s) as the SRS port(s) in the SRS resource, PUSCH uplink performance cannot be guaranteed in this Rx beam training duration either. Thus, the spatial relation for periodic/semi-persistent SRS could always be believed as known.

For aperiodic SRS, generally, it could be believed as an urgent sounding behavior. It means the network doesn't want additional beam training time and needs this sounding information as soon as possible. As defined in TS38.214 6.2.1, the time interval between the DCI command and the aperiodic SRS transmission is about slotOffset which is a very short time duration. Thus, the aperiodic SRS should always associated with a known spatial relation.

In summary, according to embodiments, the procedure for TCI switch and SR (spatial relation) switch of the AP CSI-RS resource and reporting can be provided, and the related behaviors are also planned. Since embodiments provide a procedure of CSI-RS configuration update, TCI switching, and spatial relation switch, it is believed the method provided by embodiments is helpful to deal with unsolved problems in the field.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for CSI-RS (channel state indication-reference signal) configuration update and spatial indication switch, comprising:
receiving a CSI-RS by user equipment in a network according to a delay of CSI-RS configuration/trigger update;
receiving first data by the user equipment according to a configured TCI (transmission configuration indication) state; and
transmitting second data by the UE according to whether a known condition of an SR (spatial relation) is fulfilled and a corresponding SR (spatial relation) switch delay for the second data;
wherein the first data comprises a PDCCH (physical downlink control channel) and/or a PDSCH (physical uplink control channel), and the second data comprises an SRS (sounding reference signal), a PUSCH (physical uplink shared channel) and/or a PUCCH (physical uplink control channel).

2. The method of claim 1, wherein the network is an NR (new radio) network.

3. The method of claim 1, wherein the spatial indication comprises the SR (spatial relation).

4. The method of claim 1, wherein the spatial indication comprises a TCI.

5. The method of claim 1, wherein the CSI-RS is periodic, and the delay of CSI-RS configuration/trigger update is a sum of an RRC (radio resource control) processing time and a time of fine time tracking.

6. The method of claim 1, wherein the CSI-RS is semi-persistent, and the delay of CSI-RS configuration/trigger update is a sum of an HARQ (hybrid automatic repeat request) feedback time, an MAC-CE (medium access control-control element) processing time, and a time of fine time tracking.

7. The method of claim 1, wherein the CSI-RS is aperiodic, and the delay of CSI-RS configuration/trigger update is a time related to allowed slot offsets.

8. The method of claim 7, wherein a TCI triggering delay for the aperiodic CSI-RS is based on a timing of triggering an aperiodic report.

9. The method of claim 1, wherein the CSI-RS is aperiodic, the first data comprises a PDCCH (physical downlink control channel) and a PDSCH (physical uplink control channel) QCLed (quasi co-located) to the aperiodic CSI-RS, the UE applies an updated TCI of the aperiodic CSI-RS to the PDCCH and the PDSCH according to a corresponding aperiodic report received at the network.

10. The method of claim 1, wherein if a spatial setting of the PUCCH is configured to be of an SSB (synchronization signal block) index or a CSI-RS index, a known condition for the SR re-uses a known condition of the TCI state.

11. The method of claim 1, wherein if a spatial setting of the PUCCH is configured for SRS, and the SR is in a known condition, the SR is switched.

12. The method of claim 1, wherein if the SR is switched to be in an unknown condition, the UE is allowed to transmit the PUCCH with an arbitrary spatial domain transmission filter during a beam training phase.

13. The method of claim 1, wherein CSI (channel state information) reporting of the CSI-RS is one of CQI (channel quality indication) reporting, RI (rand indication) reporting and PMI (precoding matrix indication) reporting.

14. The method of claim 1, wherein the SRS is aperiodic, the spatial relation switch delay of the aperiodic SRS is measured only when the UE has sent a corresponding measurement report to the network and the spatial relation of the aperiodic SRS is in a known condition.

* * * * *